(12) United States Patent
Pellegrino et al.

(10) Patent No.: US 6,745,258 B1
(45) Date of Patent: Jun. 1, 2004

(54) RAID SYSTEM HAVING MULTIPLE REPLY QUEUES FOR USE WITH MULTIPROCESSOR HOST

(75) Inventors: Greg John Pellegrino, Tomball, TX (US); Robert Van Cleve, The Woodlands, TX (US); Andrew Bond, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 09/643,633

(22) Filed: Aug. 22, 2000

(51) Int. Cl.[7] .................. G06F 13/00; G06F 13/14; G06F 3/00

(52) U.S. Cl. .................. 710/33; 710/2; 710/28; 710/38; 710/39; 710/107; 713/200

(58) Field of Search ............... 710/310, 100, 710/26, 312, 39, 72, 74, 33, 240, 2, 28, 38, 107; 713/200

(56) References Cited

U.S. PATENT DOCUMENTS

| | | | | | |
|---|---|---|---|---|---|
| 6,057,863 | A | * | 5/2000 | Olarig | 345/520 |
| 6,105,080 | A | * | 8/2000 | Holt et al. | 710/26 |
| 6,128,690 | A | * | 10/2000 | Purcell et al. | 710/240 |
| 6,421,760 | B1 | * | 7/2002 | Mc Donald et al. | 711/114 |
| 6,446,141 | B1 | * | 9/2002 | Nolan et al. | 710/8 |
| 6,477,139 | B1 | * | 11/2002 | Anderson et al. | 370/216 |
| 6,553,408 | B1 | * | 4/2003 | Merrell et al. | 709/213 |
| 6,571,354 | B1 | * | 5/2003 | Parks et al. | 714/7 |
| 2002/0007374 | A1 | * | 1/2002 | Marks et al. | 707/513 |

* cited by examiner

Primary Examiner—Jeffrey Gaffin
Assistant Examiner—Angel Casiano

(57) ABSTRACT

An SMP computing system has a RAID controller and an interconnect bus system for communication processors and the RAID controller. There are in host memory a plurality of reply queues, at least one of which is associated with each processor of the SMP computing system. Replies associated with commands originating from a first processor are buffered by the RAID controller in a first reply queue, and replies associated with commands originating from a second processor are buffered in a second reply queue.

7 Claims, 4 Drawing Sheets

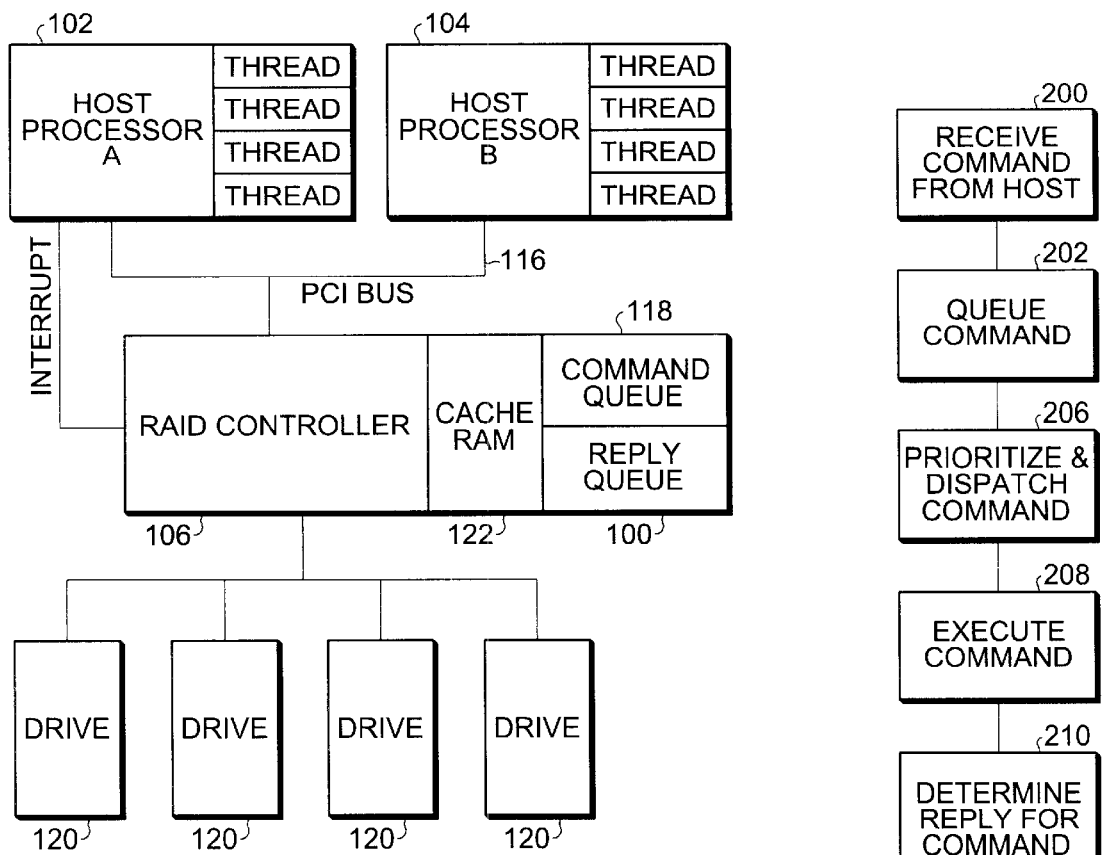
Fig. 1
Prior Art
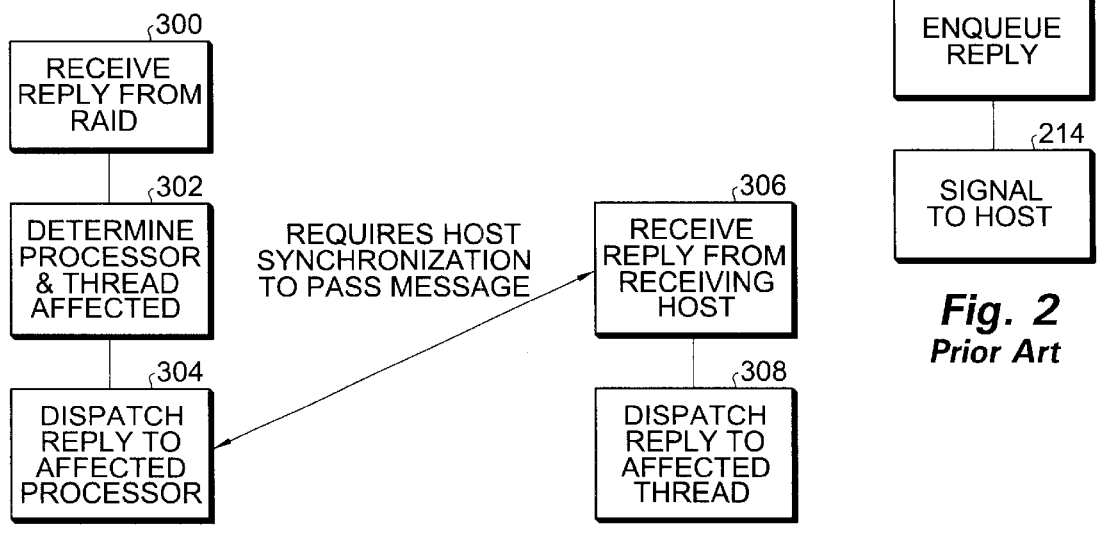
Fig. 2
Prior Art
Fig. 3
Prior Art

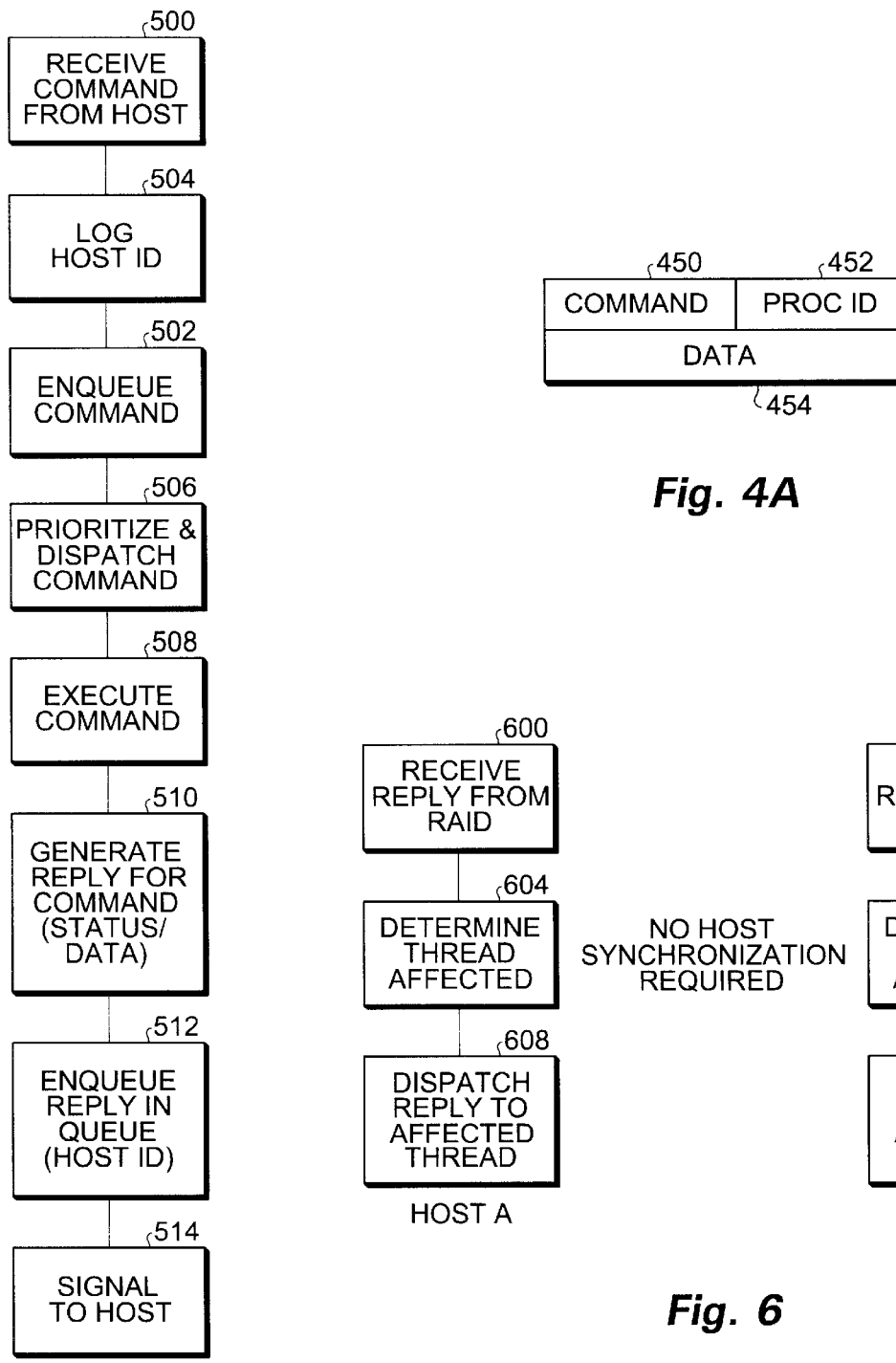

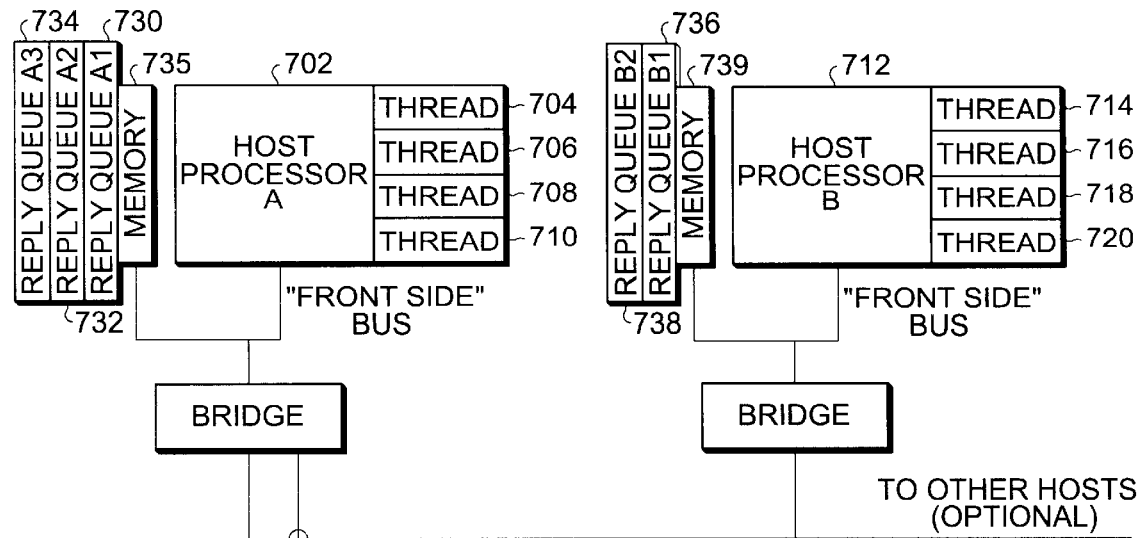
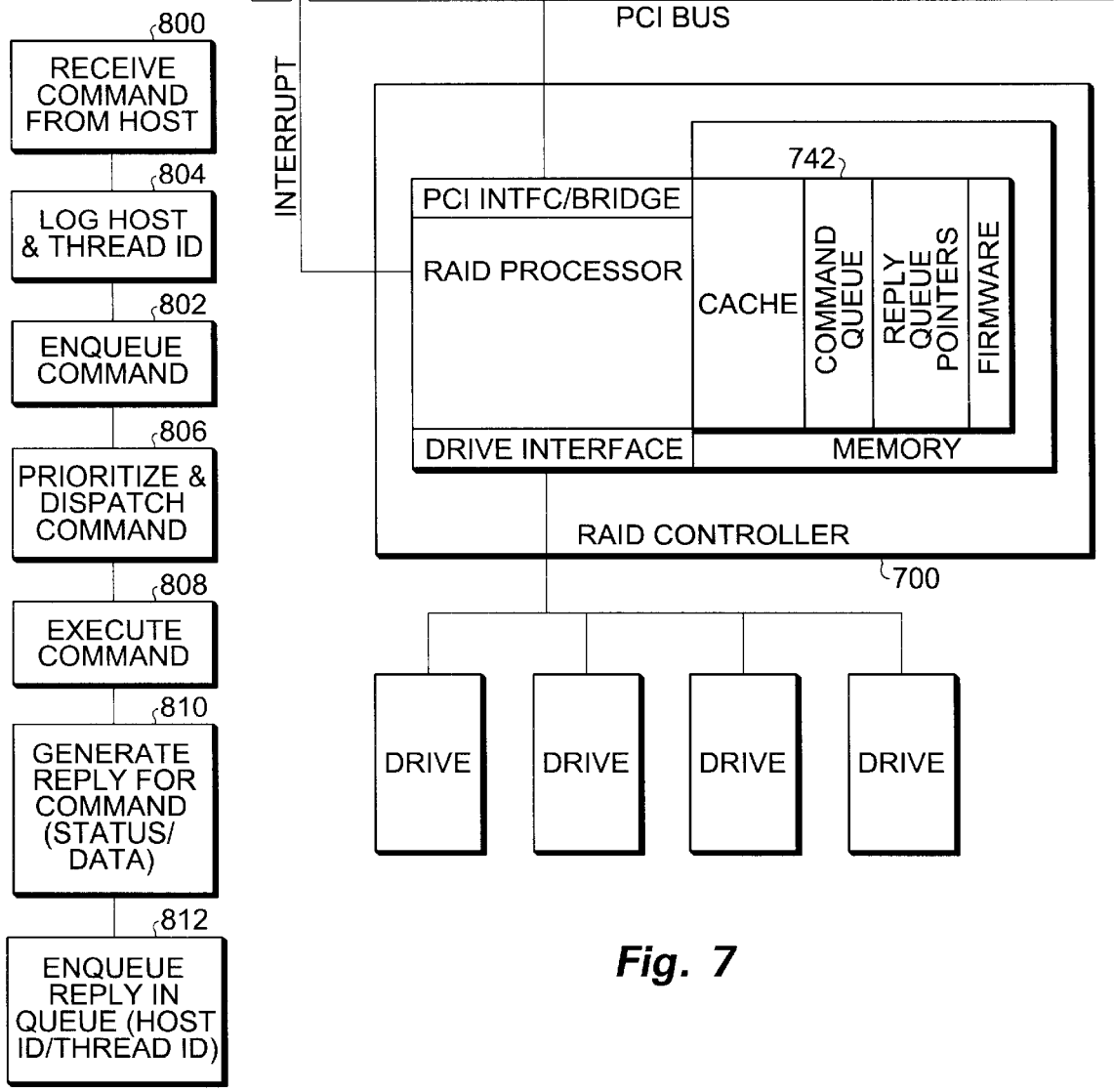
Fig. 7
Fig. 8

RAID SYSTEM HAVING MULTIPLE REPLY QUEUES FOR USE WITH MULTIPROCESSOR HOST

FIELD OF THE INVENTION

The invention relates to the field of RAID controllers and their interaction with host processors. In particular, the invention relates to RAID controllers and other intelligent host-bus adapters intended for insertion into systems having multiple host processors, where more than one host processor may run threads that are permitted to submit I/O commands to a RAID controller.

BACKGROUND OF THE INVENTION

Computing systems having more than one processor are well known in the art of computing. Among these computing systems are computing systems of the Symmetric Multiple Processor (SMP) type. SMP computing systems available from such vendors as Compaq include those having multiple Alpha, VAX, or Intel Pentium processors. SMP systems based on the SUN SPARC and other processors are known in the art. SMP systems are called symmetric because two or more of the processors in the system have similar or identical instruction sets and application program tasks may be distributed between these processors.

SMP computer systems are commercially available that run under the Microsoft Windows-NT, UNIX derivatives such as TRU-64 UNIX, and LINUX.

It is known that many SMP operating systems designate a particular processor to be a master processor, responsible for receiving interrupts from I/O devices and dispatching information obtained therefrom to the processor requiring information about the interrupt. This technique is often dictated by the design of the hardware, since I/O devices are often coupled to only one of the processors of an SMP system.

It is known to be desirable to queue results from intelligent peripherals because this permits the peripherals to perform following operations while waiting for a host to act upon results. This is advantageous since processing each result can take significant time.

In a RAID (Redundant Array of Independent Disks) controller as known in the art, there is a single reply queue even if the RAID controller is intended for insertion into an SMP system. The reply queue may be located in the RAID system, or may be positioned in memory of the host and written to through DMA (Direct Memory Access) operations by the RAID controller. PCI compliant busses are often used to interconnect RAID controllers to the processors and memory systems of an SMP system.

When each command to the RAID system executes the RAID system generates a reply associated with that command as known in the art. The generated reply includes command completion status for both read and write commands, and may, but need not, include data for read commands. The reply is thereupon stored in a reply queue of the RAID controller.

If the reply queue is located in host memory, the RAID controller arbitrates for access to the bus and sends the reply to memory of the master host processor. If the reply queue is located in RAID memory, the RAID controller will often signal the master host processor with an interrupt, the master host processor will then read the reply from the queue. Once received by the master host processor, that processor must determine the processor, and possibly the thread, affected by the reply. That reply must thereupon be dispatched to the affected processor.

It is known that in some operating systems, such as Windows NT, communication of a reply from one processor to another requires that the processors be synchronized through a synchronization wait. This synchronization wait can consume significant time.

It is desirable to minimize the processor time associated with synchronization wait operations. It is also desirable to balance the loading among the processors of an SMP system, such that the master processor not have excessive load.

SUMMARY OF THE INVENTION

A RAID controller is intended for attachment to a PCI bus, with which it may communicate with two or more processors of a multiple-processor computing system.

There are reply queues associated with the RAID controller associated with each host processor of the system. For example, a RAID controller in a system having two host processors will have two reply queues. There may be additional host processors, in which case there will be additional reply queues. Each reply queue is used for replies to commands received from an associated host processor. Each reply queue is located in memory of the associated host processor.

When a command is received by the RAID controller from a host processor, the command is placed in a command queue of the RAID controller. The identity of the host originating the command is logged and kept in association with the command in the command queue. Commands are prioritized, dispatched, and executed from the command queue as known in the art of RAID controllers.

When each command executes, the RAID system generates a reply associated with that command. The generated reply is thereupon transferred over the bus to memory associated with the processor that originated the command, and stored in the reply queue associated with that host processor.

In an alternative embodiment, a reply queue of the RAID system is associated with each thread performing I/O operations and running on a processor of the system.

The present invention is believed applicable to intelligent host bus adapters of other types as well as to RAID controllers.

BRIEF DESCRIPTION OF THE DRAWINGS

FIG. 1 is a block diagram of a computing system as known in the art and having multiple processors that may communicate with a RAID controller;

FIG. 2, a flowchart of operations performed by a RAID controller as known in the art when receiving commands from a processor;

FIG. 3, a flowchart of operations performed by the processors of a multiple processor computing system upon receipt of a reply from a RAID controller as known in the art;

FIG. 5, a flowchart of operations performed by a RAID controller of the present invention when receiving commands from a processor;

FIG. 6, a flowchart of operations performed by the processors of a multiple processor computing system upon receipt of a reply from a RAID controller;

FIG. 7, a block diagram of an alternative embodiment of a computing system of the present invention and having multiple processors that may communicate with a RAID controller; and FIG. 8, a flowchart of operations performed by a RAID controller of the alternative embodiment when commands are received from a processor.

DETAILED DESCRIPTION

Figure 4:
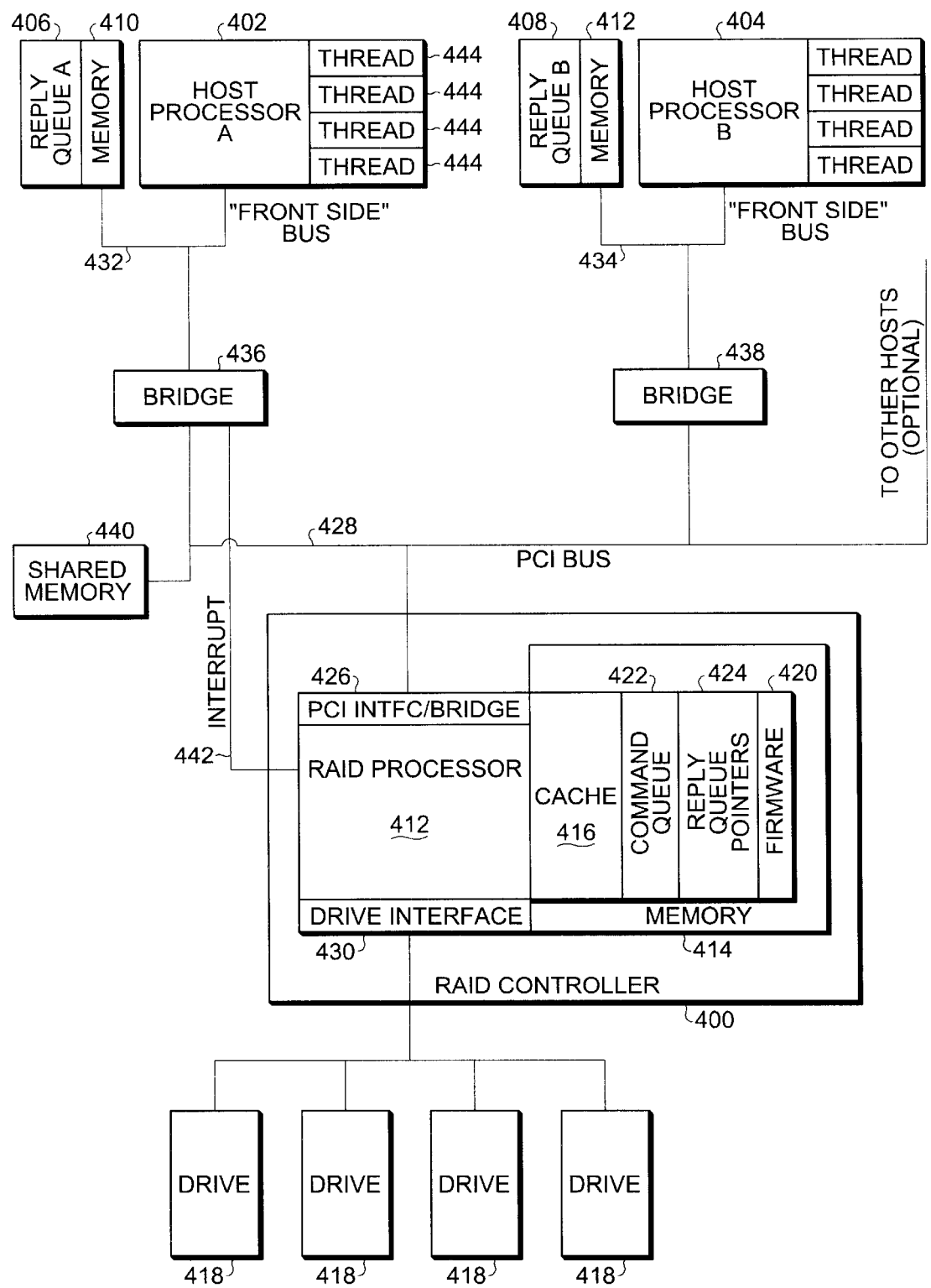
FIG. 4, a block diagram of a computing system of the present invention and having multiple processors that may communicate with a RAID controller.

In a system incorporating a RAID controller as known in the art, there is a single reply queue 100 even if there be more than one host processor 102 and 104 in the system.

For example, a RAID controller 106 (FIG. 1) in a system having a first host processor 102 and a second host processor 104, has a single reply queue 100. There may be additional host processors, but typically only the single reply queue.

With reference to FIGS. 1 and 2, when a command is received 200 by the RAID controller 106 from a host processor over the bus 116 that connects the processors to the RAID controller, the command is placed 202 in a command queue 118 of the RAID controller. The bus 116 interconnecting the host processors 102 and 104 with the RAID is often a PCI bus of the 32 or 64 bit type operating at 33 or 66 MHz.

Commands are prioritized and dispatched 206 from the command queue 118 as known in the art of RAID controllers. Commands need not be completed in-order, as known in the art. When each command executes 208, the RAID system stores any data read from the disk drives 120 or cache RAM 122 to memory designated in the command, and generates 210 a reply associated with that command as known in the art. The generated reply includes command completion status for both read and write commands. The reply is thereupon stored 212 in the reply queue 100.

Once the reply is queued 212, the RAID controller may signal 214 the master host processor, perhaps host processor A 102, through an interrupt. Alternatively, the reply may sit on the reply queue until the master host processor inspects the queue for any pending replies.

Once received 300 (FIG. 3) by the master host processor, illustrated as Host Processor A, that processor must determine 302 the processor, illustrated as Host Processor B, and possibly the thread, affected by the reply. That reply must thereupon be dispatched 304 to the affected processor. It is known that in some operating systems, such as Windows NT, communication of a reply from one processor to another requires that the processors be synchronized through a synchronization wait. This synchronization wait can consume significant time.

When the reply is relayed to, and received 306 by, the affected processor, the reply must then be dispatched 308 to the affected thread.

In a system incorporating a RAID controller according to the present invention, there are reply queues associated with each host processor of the system. For example, a RAID controller 400 (FIG. 4) in a system having a first host processor 402 and a second host processor 404, will have a first reply queue 406 and a second reply queue 408. There may be additional host processors, in which case there will be additional reply queues.

The first reply queue 406 is located in memory 410 of the first host processor 402 and used for replies to commands received from the first host processor 402. The second reply queue 408 is located in memory 412 of the second host processor 404 and is used for replies to commands received from the second host processor 404.

The RAID controller 400 is an intelligent peripheral, incorporating a processor 412 and memory 414. The memory 414 includes cache memory 416 for storing data read from and written to the disk drives 418. The memory 414 also firmware memory 420 for storing firmware for controlling operation of the RAID controller. Memory 414 also stores a command queue 422 and a set of reply queue pointers 424. The reply queue pointers 424 include pointers to the locations in host memory of each reply queue, including the first reply queue 406 and the second reply queue 408.

The RAID controller also has a PCI interface and bridge 426 that permits it to originate as well as receive transactions on a PCI bus 428 that connects it with the host processors, and a drive interface 430 that couples it to the disk drives 418.

Each host processor has a front-side bus 432 and 434 that couples it with its associated memory, and a bus bridge 436 and 438 that couples its front-side bus to the PCI bus 428.

The processor of the RAID controller executes suitable firmware to control its actions, including management of queues. The firmware may be loaded to firmware memory 414 from a host, stored in a ROM or EPROM, or read from suitable media at system boot time. At system boot time, the RAID controller is instructed as to the number of host processors 402 and 404 in the system, and for each host processor the location in PCI space of the associated reply queues 406 and 408. The locations in PCI space of the reply queues is stored in the reply queue pointers 424.

Some systems allow for hot-plugging of processors. Should an additional processor be inserted into the system, the RAID controller may also instructed with the location of the reply queue to be associated with the additional processor.

Each command is communicated from host processor to the RAID controller by constructing a command block as illustrated in FIG. 4A, this command block comprises a command field 450, an originating processor identifier field 452, and may include a data pointer field 454 to a location where data associated with the command is or will be located upon command completion. There may be additional fields such as a returned status pointer or returned status field. The data indicated by the data pointer field 454 may be located in shared memory 440 of the system, or may be located in memory associated with a specific processor of the system, such as memory 410 associated with the first host processor 402 or memory 412 associated with the second host processor 404.

With reference to FIGS. 4 and 5, when a command is received 500 by the RAID controller 400 from a host processor over the bus 428 that connects the processors to the RAID controller, the command is placed 502 in a command queue 422 of the RAID controller. The identity of the host originating the command is logged 504 and kept in association with the command in the command queue 422. The bus 428 interconnecting the host processors 402 and 404 with the RAID may be a PCI bus of the 32 or 64 bit type operating at 33 or 66 MHz, or may be another suitable processor-to-peripheral interconnect system.

Commands are prioritized and dispatched 506 from the command queue 422 as known in the art of RAID controllers. Commands need not be completed in-order, as known in the art. When each command executes 508, the RAID system may read or write data, and then generates a reply 510 associated with that command as known in the art. The generated reply includes command completion status. The reply is thereupon stored 512 in the reply queue 406 or 408 associated with the host processor 402 or 404 that originated the command.

Storing of the reply in the queue is accomplished through having the RAID processor 412 read the location of the appropriate reply queue from the reply queue pointers 424. The processor then writes, through the PCI Interface and Bridge 426, over the PCI bus 428, through the appropriate bridge 436 or 438, and into the associated reply queue 406 or 408.

Once the reply is queued 512, the RAID controller may optionally signal 514 a host processor 402 or 404 through an interrupt 442.

It has been found that performance under Windows NT is enhanced if the originating host processor 402 or 404 polls its associated reply queue 406 or 408 instead of awaiting an interrupt because of the high cost of synchronization for interprocessor communications under Windows NT. Alternatively, it is expected that high performance can be attained if separate interrupts are provided to each host processor of the system.

For example, should a command originate at the first host processor 402, the reply is queued 512 in the associated reply queue 406. The originating host processor then dispatches the reply to the appropriate thread of the threads 444 executing on that host.

The system, including the RAID controller, of the present invention offers advantage in that each host receiving a reply 600 or 602 (FIG. 6) from the RAID controller need only determine 604 or 606 the appropriate thread associated with the reply, and dispatch 608 or 610 the reply to that thread. The receiving host need not determine the host associated with the reply, since that has already been done for it by the RAID controller. Therefore, no message need be passed from a master host processor, such as host processor 402, to a slave processor such as second host processor 404. No host synchronization, or synchronization wait, is required even with an operating system like Windows NT.

In an alternative embodiment of a system incorporating a RAID controller according to the present invention, there are reply queues associated with each thread performing I/O operations and running on each host processor of the system. For example, consider a RAID controller 700 (FIG. 7) in a system having a first host processor 702 running threads 704, 706, 708, and 710, and a second host processor 712 running threads 714, 716, 718, and 720. Assume threads 704, 706, 708, 714, and 716 perform I/O operations to the RAID controller 700. The RAID controller 700 will therefore maintain reply queues 730, 732, and 734 associated with threads 704, 706 and 708 of the first host processor 702 in memory 735 of the first host processor 702. Similarly, there will be reply queues 736 and 738 in memory 739 associated with threads 714 and 716 of the second host processor 712. There may be additional reply queues. Each reply queue is used to hold replies associated with commands dispatched to the RAID controller 700 from the associated thread.

In this embodiment, the command block further comprises a thread identifier field (not shown).

With reference to FIGS. 7 and 8, when a command is received 800 by the RAID controller 700 from a host processor over the bus 740 that connects the processors to the RAID controller 700, the command is placed 802 in a command queue 742 of the RAID controller 700. The identity of the host and thread originating the command is logged 804 and kept in association with the command in the command queue 742.

Commands are prioritized and dispatched 806 from the command queue 442 as known in the art of RAID controllers. Commands need not be completed in-order, as known in the art. When each command executes 808, the RAID system generates a reply 810 associated with that command as known in the art. The generated reply includes command completion status for both read and write commands. The reply is thereupon stored 812 in the reply queue associated with the host processor and thread that originated the command. Should the host processor and thread identification associated with the reply not have been seen before, an appropriate reply queue is created. Reply queues that have not been used for an extended period may be destroyed to conserve memory.

What is claimed is:

1. A multiple processor computing system comprising:
   at least a first processor having an identity and a first memory, and a second processor having an identity and a second memory;
   an intelligent peripheral controller further comprising a processor and a third memory;
   an interconnect bus system for communication between the first processor, the second processor, and the intelligent peripheral controller,
   a plurality of disk drives coupled to the intelligent peripheral controller;
   a first reply queue located in memory addressable by the first processor;
   a second reply queue located in memory addressable by the second processor;
   and wherein replies from the intelligent peripheral controller associated with commands originating from the first processor are placed by the intelligent peripheral controller into the first reply queue, and replies from the intelligent peripheral controller associated with commands originating from the second processor are placed by the intelligent peripheral controller into the second reply queue.

2. The computing system of claim 1, wherein the intelligent peripheral controller is a RAID controller.

3. The computing system of claim 2, wherein the interconnect bus system is PCI compliant.

4. A RAID controller for use in an SMP computing system, the RAID controller comprising:
   a memory system;
   a processor coupled to the memory system;
   an interface to a bus, the bus coupled to the processor and the memory system, the bus suitable for coupling the RAID controller to one or more host processors;
   a disk interface coupled to the processor and the memory, the disk interface suitable for coupling the RAID controller to one or more disk drives;
   wherein the RAID controller is capable of receiving information locating a plurality of reply queues in memory addressable by the host processors; and
   wherein the processor of the RAID controller is capable of associating a command with an originating host processor and writing a reply associated with that command to a reply queue associated with that host processor.

5. The RAID controller of claim 4, wherein the RAID controller is capable of storing replies associated with commands originating from a first processor of the one or more host processors in a first reply queue of the plurality of reply queues, and commands originating from a second processor of the one or more host processors are stored in a second reply queue of the number of reply queues.

6. A RAID controller for use in an SMP computing system, the RAID controller comprising:

a memory system;

a processor coupled to the memory system;

an interface to a bus, the bus coupled to the processor and the memory system, the bus suitable for coupling the RAID controller to one or more host processors;

a disk interface coupled to the processor and the memory, the disk interface suitable for coupling the RAID controller to one or more disk drives;

wherein the RAID controller is capable of receiving commands, wherein each command indicates an identity of a host processor; and wherein the processor of the RAID controller is capable of performing DMA operations over the bus to store a reply associated with a command into a reply queue associated with the host processor indicated in that command.

7. The RAID controller of claim 6, wherein each command further indicates an identity of a thread, and wherein the processor of the RAID controller is capable of associating a reply queue with each combination of identity of a host processor and identity of a thread.

* * * * *